United States Patent
Wang et al.

(10) Patent No.: US 9,078,276 B2
(45) Date of Patent: Jul. 7, 2015

(54) SCHEDULING AND RATE CONTROL COORDINATION ACCOUNTING FOR INTERFERENCE CANCELLATION AT A MOBILE TERMINAL

(71) Applicant: Telefonaktiebolaget LM Ericsson (publ), Stockholm (SE)

(72) Inventors: Yi-Pin Eric Wang, Fremont, CA (US); Jung-Fu Cheng, Fremont, CA (US); Stephen Grant, Pleasanton, CA (US); Ali S. Khayrallah, Mountain View, CA (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 169 days.

(21) Appl. No.: 13/675,741

(22) Filed: Nov. 13, 2012

(65) Prior Publication Data

US 2014/0135028 A1 May 15, 2014

(51) Int. Cl.
*H04W 72/00* (2009.01)
*H04W 72/12* (2009.01)
*H04J 11/00* (2006.01)

(52) U.S. Cl.
CPC ...... *H04W 72/1231* (2013.01); *H04W 72/1205* (2013.01); *Y02B 60/50* (2013.01); *H04J 11/004* (2013.01)

(58) Field of Classification Search
USPC .................. 370/329, 252, 328, 332; 455/450–452.2, 522, 501, 67.13
See application file for complete search history.

(56) References Cited

U.S. PATENT DOCUMENTS

| | | | |
|---|---|---|---|
| 2007/0019583 A1* | 1/2007 | Laroia et al. ................. | 370/329 |
| 2008/0239938 A1* | 10/2008 | Jalloul et al. ................. | 370/201 |
| 2009/0201907 A1* | 8/2009 | Nanda et al. .................. | 370/345 |
| 2010/0009705 A1 | 1/2010 | Budianu et al. | |
| 2011/0223964 A1* | 9/2011 | Ebiko ............................ | 455/522 |
| 2011/0319084 A1* | 12/2011 | Meshkati et al. ............. | 455/436 |
| 2012/0140706 A1 | 6/2012 | Doppler et al. | |

FOREIGN PATENT DOCUMENTS

EP 2413514 A1 2/2012

OTHER PUBLICATIONS

International Search Report and the Written Opinion of the International Searching Authority dated Feb. 19, 2014, in International Application No. PCT/IB2013/060084, 13 pages.
Huawei et al."Considerations on Range Expansion" 3GPP TSG RAN WG1 Meeting #71, R1-125135. 2012, 4 pages.

* cited by examiner

*Primary Examiner* — Daniel Lai
(74) *Attorney, Agent, or Firm* — Rothwell, Figg, Ernst & Manbeck, P.C.

(57) ABSTRACT

Devices and methods for scheduling and interference cancellation that consider the interference cancellation capability of user equipment (UEs) are disclosed. Using reduced-rate subframe (or resource block) strategies, the transmission data rate to a scheduled user in a given cell may be reduced to ensure effective interference cancellation performance at the receiver of a co-scheduled user in another cell. By taking advantage of interference mitigation at one or more terminals, a scheduler may improve network spectral efficiency compared to existing inter-cell interference cancellation schemes, including almost blank sub-frame (ABS), further enhanced inter-cell interference coordination (FeICIC), and other resource partitioning schemes, such as reduced power subframes or frequency domain resource partitioning.

30 Claims, 16 Drawing Sheets

SCHEDULING AND RATE CONTROL COORDINATION ACCOUNTING FOR INTERFERENCE CANCELLATION AT A MOBILE TERMINAL

TECHNICAL FIELD

The present invention relates generally to improving data transmission on telecommunication networks and, more particularly, to methods and devices for providing scheduling and rate control coordination accounting for interference cancellation at a mobile terminal.

BACKGROUND

3GPP Long Term Evolution (LTE) is a standard for mobile phone network technology. LTE is a set of enhancements to the Universal Mobile Telecommunications System (UMTS), and is a technology for realizing high-speed packet-based communication that can reach high data rates on both downlink and uplink channels. As illustrated in FIG. 1, LTE transmissions are sent from base stations 102,110 such as Node Bs (NBs) and evolved Node Bs (eNBs) in a telecommunication network 106, to mobile stations 104, 108 (e.g., user equipment (UEs)). Examples of wireless UE communication devices include mobile telephones, personal digital assistants, electronic readers, portable electronic tablets, personal computers, and laptop computers. The UEs operate within serving cells 112, 114 corresponding to base stations 102, 110, respectively. LTE wireless communication systems may be deployed in a number of configurations, such as, for example, a Multiple-Input, Multiple-Output (MIMO) radio system.

The LTE standard is primarily based on Orthogonal Frequency Division Multiplexing (OFDM) in the downlink, which splits the signal into multiple parallel sub-carriers in frequency. In LTE, available transmission capacity is divided within the frequency domain 206 and time domain 208 into a plurality of resource blocks (RBs). For instance, as illustrated in FIG. 2, a frame 200 comprised of transmission resources (e.g., RBs) 202, 204 may be transmitted in accordance with the LTE standard. Each of resources 202, 204 may consist, for example, of twelve (12) sub-carriers in the frequency domain and 0.5 ms in the time domain.

One aspect of the LTE transmission scheme is that the time-frequency resources can be shared between users. A scheduler controls assignment of the resources among the users (for both downlink and uplink) and also determines the appropriate data rate to be used for each transmission. Due to the use of OFDM, the scheduler can allocate resources for each time and frequency region. For instance, in the example of FIG. 2, a first user may be allocated a first group of resources (shown with hashing) that includes resource 202 while a second user is scheduled for transmission on a second group of resources (shown without hashing) that includes resource 204. In most systems, the condition of the channel for each user is a consideration in determining the most efficient allocation of resources. For instance, a scheduler may be configured to give scheduling priority to UEs with the highest channel quality.

The quality of the signal received by a given user is dependent upon a number of factors, including the channel quality from the serving node, the level of interference from other cells and nodes, and the noise level. In order to optimize the overall capacity of the system, a scheduler will typically try to match the modulation, coding, and other signal/protocol parameters to the signal quality. For instance, when signal quality is low, a scheduler may reduce the coding rate or select a lower-order modulation scheme to increase tolerance to interference and raw bit error rates (e.g., error rates measured before decoding) or to otherwise improve robustness.

According to the LTE standard, UEs may be configured to report Channel Quality Indicators (CQIs) to assist the scheduler. These CQI reports are derived from the downlink received signal quality and are often based on measurements of the downlink reference signals (RSs). Channel Quality Indicators may be referred to as Channel State Information (CSI) in certain systems.

Despite the many advantages of existing LTE schemes and protocols, there exists a significant problem with inter-cell interference and a need to coordinate between cells in order to mitigate the negative effects of interference. The LTE standard is primarily designed to operate under the presumption that the entire spectrum is available in each cell. In other words, that the same time-frequency resources may be used in neighboring cells with limited interference. However, this is not always true in practice, particularly at the cell-edge. Transmissions intended for a first user in a first cell, are often overheard by a second, unintended user in a second cell.

In a heterogeneous network (HetNet), the impact of inter-cell interference can be much higher due to the large difference between the transmit power levels of macro and, for example, pico base stations. A HetNet deployment is illustrated in exemplary network 300, which is shown in FIG. 3. The striped and dotted regions 302, 304 represent the serving area of a pico base station 306. The dotted region 304 represents an area where the received power from the pico base station 306 is higher than that from the macro base station 308. The striped region 302 represents an area where the path loss between UE 310 and the pico base station 306 is smaller than that to the macro base station 308. If the pico base station 306 had the same transmit power as the macro base station 308, the dotted region 304 would be expanded to cover the striped region 302. However, in practice, the transmit power level of a pico base station is typically much lower than that of a macro base station, resulting in a much smaller area of the dotted region 304 shown in FIG. 3.

The striped region 302 is often referred to as the "range-expansion zone" because, from an uplink perspective, the system 300 would still prefer that UE 310 be served by the pico base station 306 within this region. However, from the downlink perspective, terminals at the outer edge of such a range-expansion zone experience very large received power differences between the macro and pico layers. For instance, in the example of FIG. 3, if the transmit power levels are 40 watt and 1 watt, respectively, from macro base station 308 and pico base station 306, the power difference can be as high as 16 dB at UE 310. Thus, if UE 310 is in the range-expansion zone and served by pico base station 306 in the downlink, while at the same time the macro base station 308 is serving UE 312 using the same radio resources, UE 310 would be subject to severe interference from the macro base station 308.

Existing solutions to this type of interference attempt to avoid simultaneous scheduling of transmission to and from UEs at the cell-edge of neighboring cells. In order to support inter-cell interference coordination, information is communicated between nodes using, for instance, the X-2 interface, in accordance with the LTE specification. Each cell can identify the high-power resource blocks in the frequency domain (e.g. in terms of resource blocks) or time domain (e.g. in terms of sub-frames) for its neighboring cells. This allows the neighboring cells to schedule cell-edge users in a manner that avoids these high-power radio resources. Also, reduced power sub-frame approaches may be used. These mechanisms are currently employed to reduce the impact of inter-cell interference in LTE.

Scheduling coordination between cells in existing systems, however, is not coupled with rate control. The main objective of conventional inter-cell interference coordination (ICIC) schemes is to avoid reusing the radio resources that have high transmit power levels in neighboring cells. Such an approach ensures cell-edge user performance at the expense of network spectral efficiency. The reduction in network spectral efficiency can be even worse for frequency domain partitioning schemes (e.g. frequency-reuse factor greater than 1) or time domain partitioning schemes (e.g. the almost-blank sub-frame (ABS) approach considered for heterogeneous networks (HetNet)).

Some mobile terminals, known as "interference mitigation receivers," have internal interference cancellation capabilities. There are various types of interference mitigation receivers, such as post-decoding successive interference cancellation (SIC) receivers and iterative multi-stage turbo interference cancellation (turbo-IC) receivers.

To fully take advantage of a user terminal's (UE's) interference cancellation capability, a base station should adjust the transmission data rate accordingly. This has been done in the single-user MIMO (SU-MIMO) case, which is illustrated in FIG. 4. The serving base station 402 sends multiple data streams to the same UE 404. The transmission rates of the multiple data streams can be adjusted to account for interference cancellation at the mobile terminal.

For example, the $1^{st}$ data stream of FIG. 4 can be decoded by UE 404 first, despite the presence of interference from the $2^{nd}$ data stream. After decoding the $1^{st}$ data stream, the received signal contributed by the $1^{st}$ data stream can be cancelled; the cleaned-up received signal is used for detecting the $2^{nd}$ data stream. The base station 402 adjusts the data rate of the $2^{nd}$ data stream assuming that the interference from the $1^{st}$ data stream will not degrade (or have little effect on degrading) the reception quality of the $2^{nd}$ data stream. Such rate adjustment may in fact take place at the mobile terminal in the process of generating the channel quality indicator (CQI) estimates for the multiple data streams. In this process, the mobile terminal accounts for reduced (or no) interference from the $1^{st}$ data stream to the $2^{nd}$ data stream. The estimated CQI's are fed back to the base station, which uses them as the basis for determining SU-MIMO transmission rates. However, as discussed above, interference remains a significant problem in the case of multiple co-channel users served by nodes in different cells or multiple user MIMO (MU-MIMO) systems when multiple users are served in the same cell.

Accordingly, there is a need for improved scheduling and rate control coordination between cells and in MU-MIMO scenarios that accounts for interference cancellation by UEs in order to maximize spectral efficiency.

SUMMARY

According to certain aspects of the present invention, scheduling efficiency is improved by considering the transmission rate, location, and/or interference cancellation capabilities of UEs in a communication network. In certain embodiments, the transmission data rate to one or more interference cancellation (IC) capable UEs may be adjusted to account for the UE's ability to cancel own-cell MU-MIMO interference or other-cell interference resulting from receipt of transmissions from multiple nodes.

Scheduling decisions may be coordinated among the neighboring cells to ensure high interference cancellation efficiency at a victim terminal, i.e., a UE receiving signals intended for another UE. The scheduling coordinator selects appropriate pairings of co-scheduled users, either in the same cell or different cells, to minimize the impact of co-channel interference. According to certain aspects, the transmission data rates to one or more co-scheduled users may be lowered to ensure good interference cancellation at the other co-scheduled users. When multiple co-scheduled terminals are capable of interference cancellation, the coordinating scheduler may mix different scheduling strategies so that all IC-capable terminals share the efficiency benefit.

For example, the scheduler may determine that in a first sub-frame (or resource block), the transmission rate to a first co-scheduled IC-capable terminal should be lowered to enable a second co-scheduled IC-capable terminal to effectively perform interference cancellation. In the subsequent sub-frame, the transmission rate to the second co-scheduled IC-capable terminal may be lowered to help the first co-scheduled IC-capable terminal perform interference cancellation. In this example, when the performance is averaged over time, both IC-capable terminals see improved user data rates.

In certain respects, certain aspects of the present invention may be characterized as a "reduced-rate radio resource," approach. This is in contrast to existing sub-frame blanking (zero-rate) schemes, which are based on orthogonal time/frequency resource partitioning. Particular embodiments of the invention provide an improvement over reduced power sub-frame approaches. Specifically, in disclosed embodiments, transmission rates may be lowered, but transmission power need not be modified. In the case of existing reduced power sub-frame approaches, the transmission powers (and necessarily the transmission rates) to the interfering UE(s) are reduced, which, in general, causes the interfering signals to be undecodable by a victim UE. Certain embodiments of the invention enable higher overall system-wide data rates by fully utilizing the interference cancellation capability of the UE(s). The proposed reduced-rate solutions may also be applied to conventional reduced-power approaches as long as the transmission data rate to a co-scheduled terminal is reduced to account for both the reduced transmit power and the decodability at another co-scheduled IC-capable victim terminal.

In certain embodiments, both scheduling coordination and transmission data rate adjustment may be based on CQI estimates received from one or more UEs. They may also be determined by mobility measurements from one or more UEs, e.g., neighbor cell reference symbol received powers (RSRPs) reported to the network. A UE may also report CQI measurements with respect to neighboring cells in addition to reports for its serving cell.

According to certain aspects, a method for cancelling interference from data transmissions within a communication network between UEs and network nodes includes receiving, at a scheduling coordinator, reception quality indicators from a plurality of UEs that indicate, for each UE, representative link quality between the UE and one of a first network node and a second network node. The method further includes selecting a first scheduled UE from among the plurality of UEs to receive data from the first network node during a first period of time and a second scheduled UE to receive data from the second network node during at least a portion of the first period of time. A first data rate is determined for transmitting a first signal from the first network node to the first scheduled UE and a second data rate for transmitting a second signal from the second network node to the second scheduled UE. The selection of the first and second scheduled UEs and/or the determination of the first and second data rates are based on the received reception quality indicators for the first and second UEs, which enables the second scheduled user to cancel, from the second signal, interference caused by the first signal.

According to certain aspects, the received reception quality indicators include CQI information. The method may also include receiving, at the scheduling coordinator, mobility measurement information from one or both of the first and second scheduled UEs relating to one or more of common pilot channel (CPICH) received power, received signal code power (RSCP), and cell-specific reference signal (C-RS) received power (RSRP). In this case, the selection of the first and second scheduled UEs and/or the determination of the first and second data rates are further based on the received mobility measurement information.

In some embodiments, another method for cancelling interference from data transmissions within a communication network between user equipment and network nodes is provided. The method includes receiving, at a scheduling coordinator, location-based indicators from a plurality of UEs indicating, for each UE, a location between the UE and one of a first network node and a second network node. The method also includes selecting a first scheduled UE from the plurality of UEs to receive data from the first network node during a first period of time and a second scheduled UE to receive data from the second network node during at least a portion of the first period of time. A first data rate is determined for transmitting a first signal from the first network node to the first scheduled UE. A second data rate is determined for transmitting a second signal from the second network node to the second scheduled UE. The selection of the first and second scheduled UEs and/or the determination of the first and second data rates are based on the received location-based indicators for the first and second scheduled UEs to enable the second scheduled user to cancel from the second signal interference caused by the first signal.

In certain aspects of the invention, the method may include determining one or more reception quality indicators based on at least one of common pilot channel (CPICH) received power, received signal code power (RSCP), and cell-specific reference signal (C-RS) received power (RSRP).

In certain embodiments, data rate adjustments may be performed at a scheduling coordinator (such as the scheduling coordination unit 800 discussed in further detail below with respect to FIG. 8) that has access to the CQI, location data, and/or mobility measurement reports from UEs in one or more cells. For instance, in a High-Speed Packet Access (HSPA) system, this scheduling coordination unit may reside in or represent a radio network controller (RNC), such as RNC 514 illustrated in FIG. 5. In alternative embodiments (e.g., networks that do not include RNCs), the scheduling coordination unit 800 may represent another type of network nodes. Alternatively, a NodeB (in the case of HSPA) or eNodeB (in the case of LTE) may be designated as the scheduling coordinator among a number of coordinating cells. The coordinating scheduler may be implemented, for instance, in the data processing 708 of a base station 502. In certain instances, the cells that are being coordinated need to forward measurements to the scheduling coordinator. In a HetNet deployment, a macro cell may be the scheduling coordinator that coordinates its scheduling decision with the pico cells within its cell coverage area.

In certain embodiments, a method for cancelling interference from data transmissions within a communication network between UEs and a plurality of antennas includes receiving, at a scheduling coordinator, reception quality indicators from a plurality of UEs that indicate, for each UE, representative link quality between the UE and one of a first of a plurality of antennas and a second of a plurality of antennas. The method further includes selecting a first scheduled UE from among the plurality of UEs to receive data from the first antenna during a first period of time and a second scheduled UE to receive data from the second antenna during at least a portion of the first period of time. A first data rate is determined for transmitting a first signal from the first antenna to the first scheduled UE and a second data rate for transmitting a second signal from the second antenna to the second scheduled UE. The selection of the first and second scheduled UEs and/or the determination of the first and second data rates are based on the received reception quality indicators for the first and second UEs, which enables the second scheduled user to cancel, from the second signal, interference caused by the first signal. The antennas may be co-located on a base station, for instance, in a multi-user MIMO configuration.

According to particular embodiments, different cells may include a macro cell or pico cell whose coverage area overlaps with that of the macro cell. Thus, the term "inter-cell" interference or "other-cell" interference may include interference from a macro base station to a pico base station as well as interference between macro base stations or pico base stations.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

The impact of inter-cell interference depends closely on the interfered with or "victim" terminal's ability to mitigate interference from signals not intended for the victim terminal. For example, presuming that the victim UE includes an interference mitigation receiver, the victim UE may be able to first decode the interference signal and then cancel the interference signal before decoding its desired signal. Thus, even a strong interference signal can be rendered harmless provided that it can be decoded correctly and removed by the victim UE.

Accounting for this interference mitigation capability, transmission data rates to IC-capable terminals can be higher compared to transmissions to UEs where the interference is not cancelled. If such interference can be cancelled, there is no need to avoid reusing the same radio resources when serving a cell-edge user in a neighboring cell. However, successful interference mitigation in the victim UE is dependent upon on the transmission rate of the interfering signal. This requires that the scheduler of the cell transmitting the interfering signal have an awareness regarding the victim terminal and its link quality with respect to the interference cell. If the victim terminal is served by another cell, the scheduler needs to acquire the victim UE's link quality information from its serving cell.

Particular embodiments of the present invention are directed to methods for scheduling UEs and mitigating the effects of interference in a communication network. An exemplary communication network is provided in FIG. 5 and includes a first base station 502 and a second base station 504. Each base station has a serving cell, for instance, base station 502 serves cell 506 while base station 504 serves cell 508. The second base station 504 may be, in this example, a pico base station located within the coverage area of macro base station of 502. UE1 is within cell 508 and in communication with base station 504. UE2 is within cell 506 and in communication with base station 502. However, in certain instances, UE1 receives signals intended for UE2, i.e., UE1 is the victim of interference from base station 502.

Figure 1:
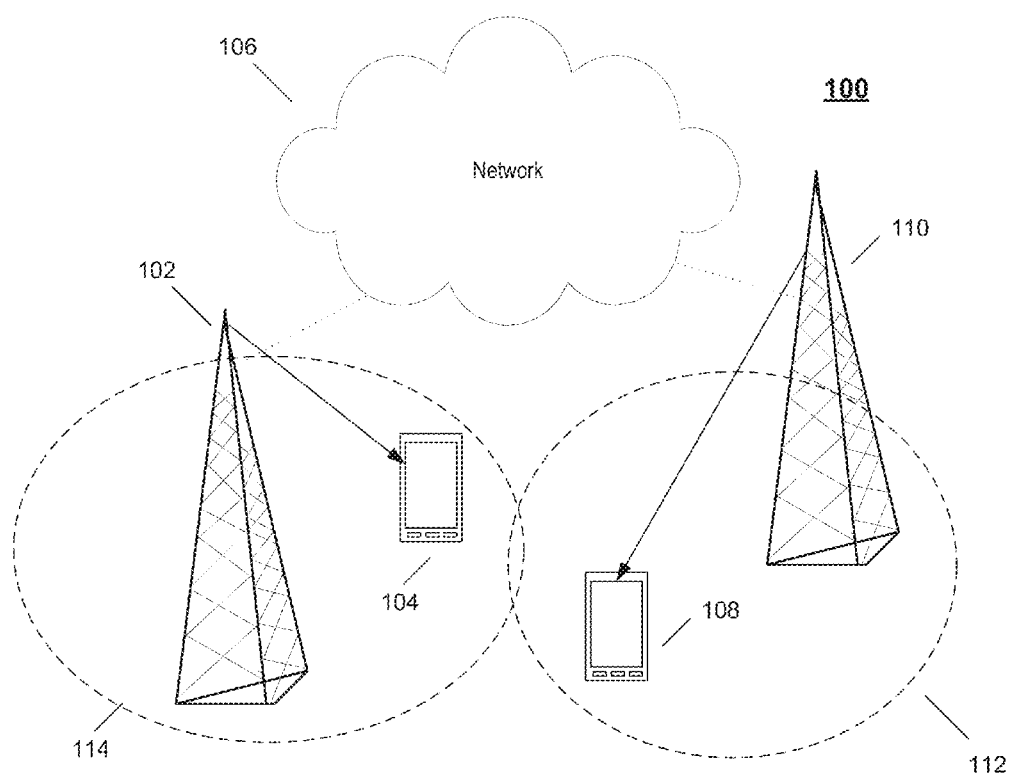
FIG. 1 is an illustration of a wireless communication system.
Figure 2:
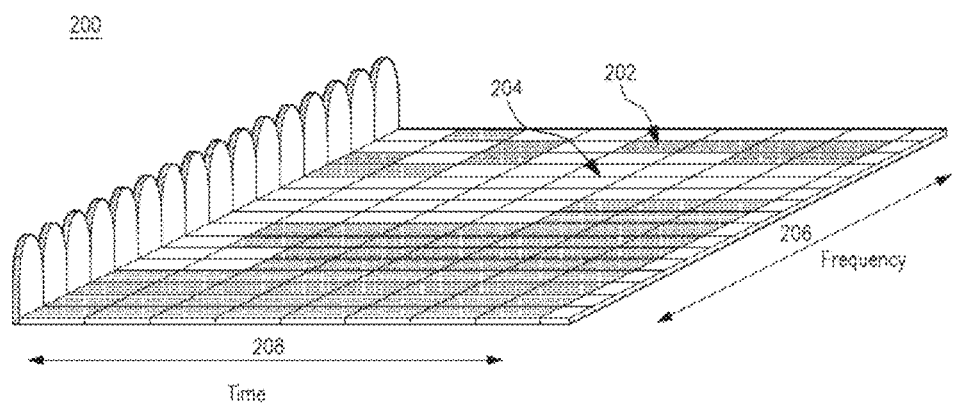
FIG. 2 is an exemplary sub-frame of an LTE transmission.
Figure 3:
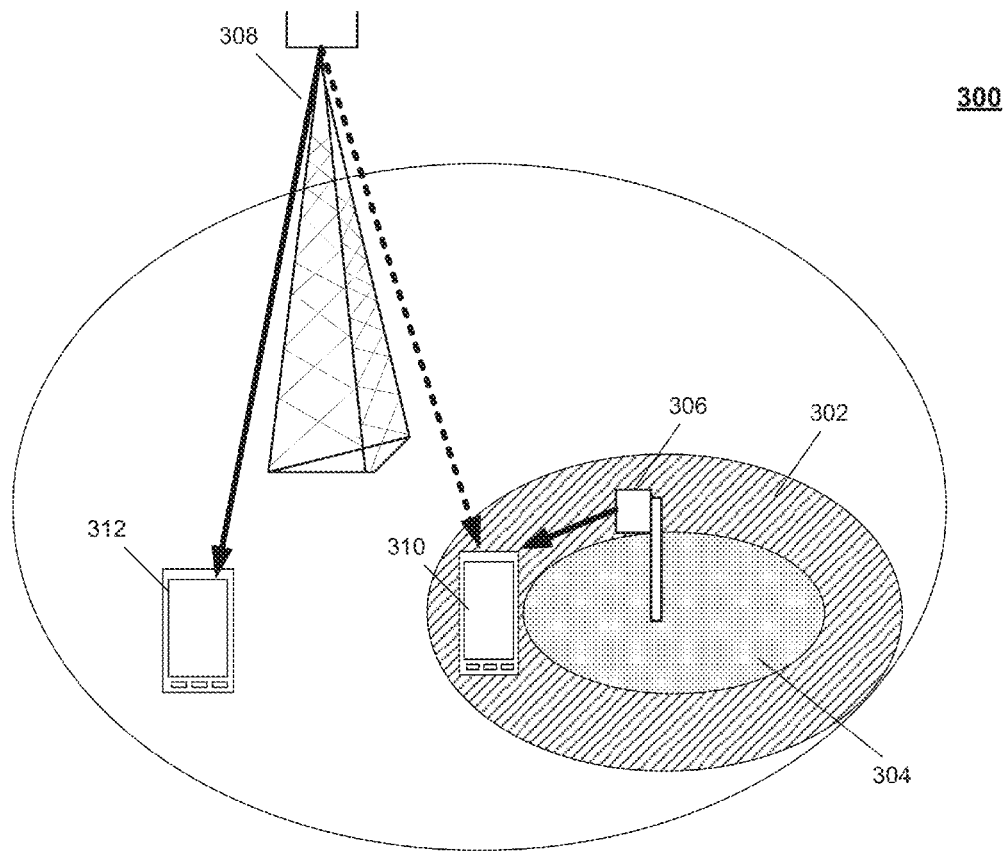
FIG. 3 is an exemplary HetNet system.
Figure 4:
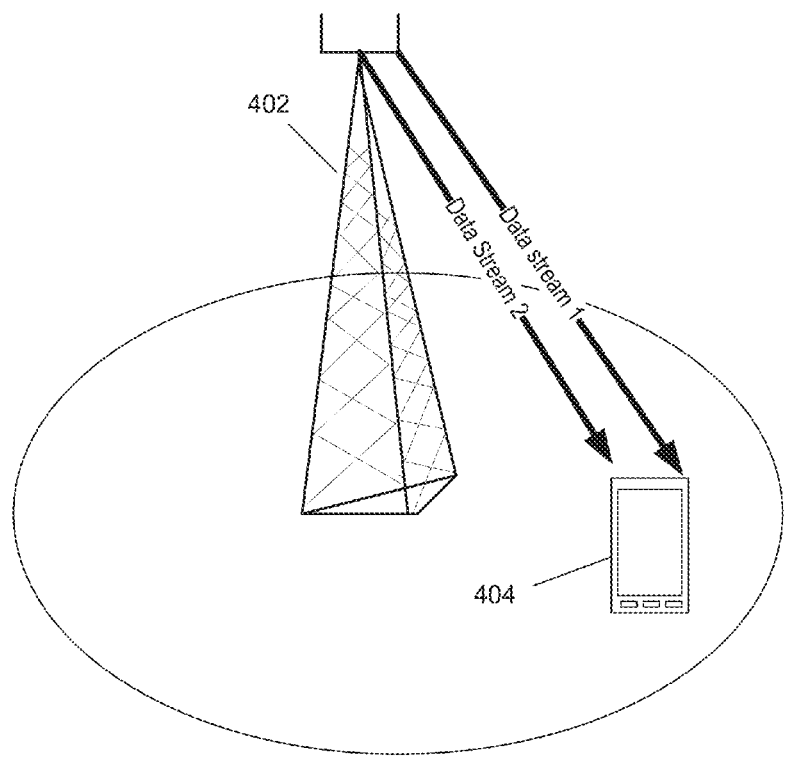
FIG. 4 is an illustration of an exemplary SU-MIMO system.
Figure 5:
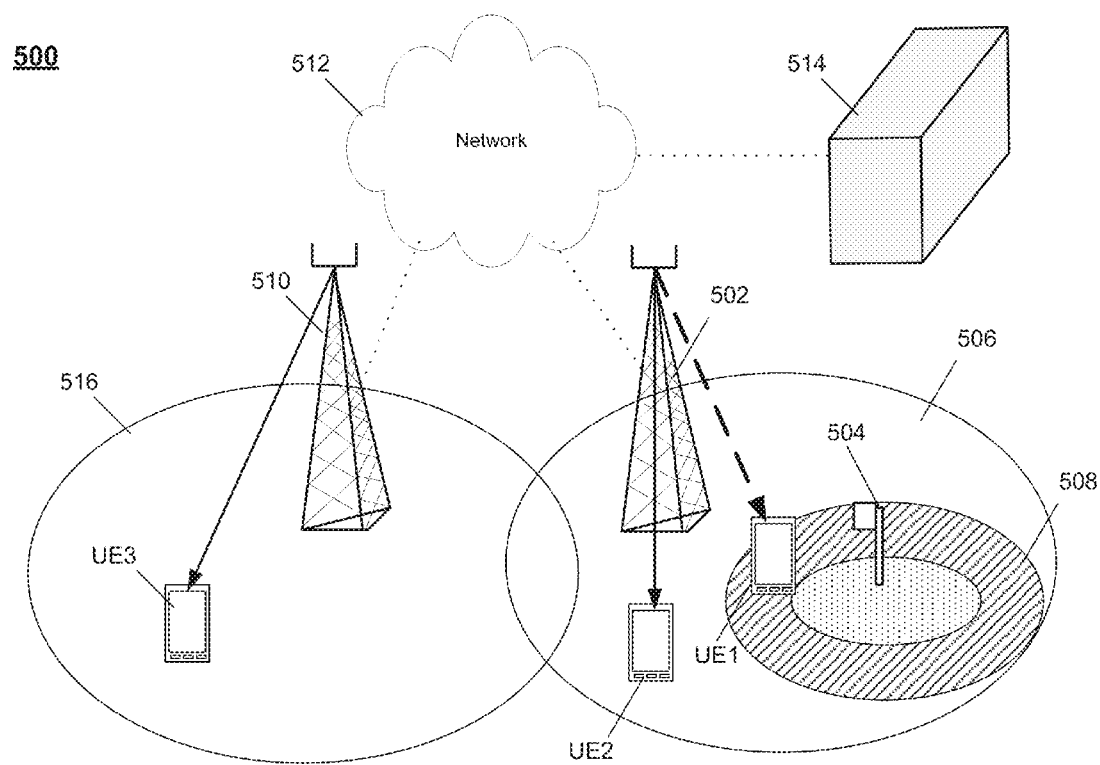
FIG. 5 is an illustration of a communication network in accordance with exemplary embodiments of the present invention.

The network 500 of FIG. 5 further includes a third base station 510, which has a serving cell indicated by 516. Base station 510 is in communication with and serving UE3 in this example. The base stations 510 and 502 are connected via a network 512. A radio network controller 514 may also be connected to the network 512 and configured to communicate with base station 510 and 502.

Figure 6:
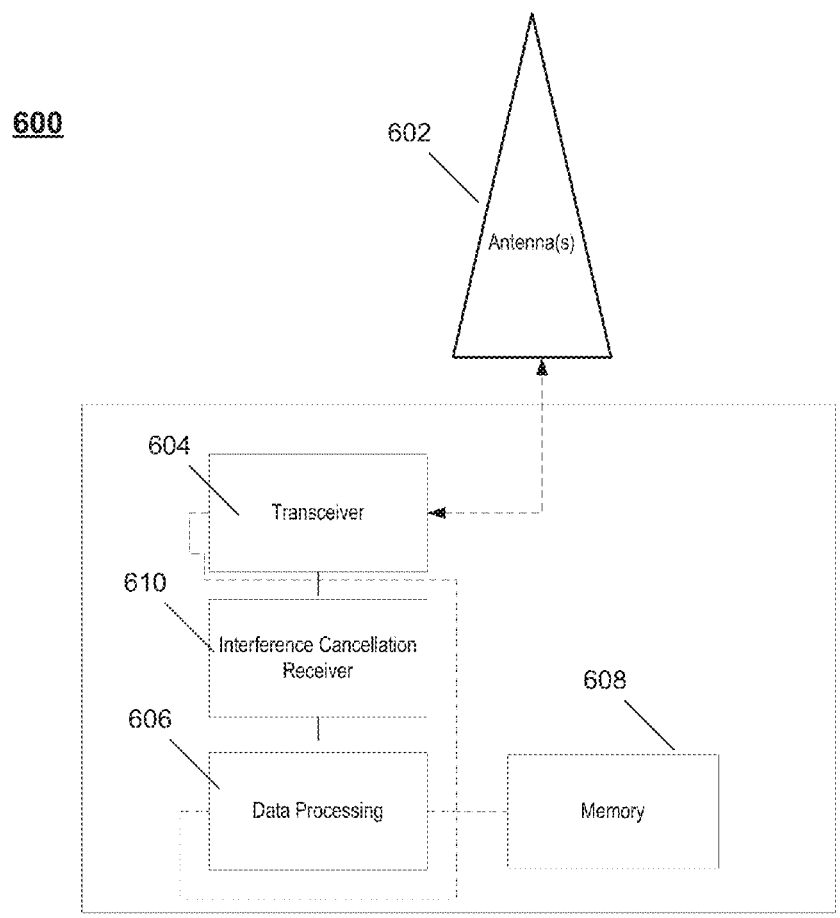
FIG. 6 is a block diagram of user equipment (UE) in accordance with exemplary embodiments of the present invention.

FIG. 6 illustrates a block diagram of an exemplary UE communication device 600, such as UE1, UE2, and UE3 of FIG. 5. As shown in FIG. 6, the UE communication device may include: one or more antennas 602, a data processing system 606, which may include one or more microprocessors and/or one or more circuits, such as an application specific integrated circuit (ASIC), field-programmable gate arrays (FPGAs), or the like, and a data storage or memory system 608, which may include one or more non-volatile storage devices and/or one or more volatile storage devices (e.g., random access memory (RAM)). The antennas 602 are connected to transceiver 604, which is configured to transmit and receive signals via the antennas 602. The UE 600 may optionally include a separate interference cancellation receiver module, or alternatively, the interference cancellation may be implemented in one of the transceiver 604 or data processing 606.

In embodiments where data processing system 606 includes a microprocessor, computer readable program code may be stored in a computer readable medium, such as, but not limited to, magnetic media (e.g., a hard disk), optical media (e.g., a DVD), memory devices (e.g., random access memory), and the like. In some embodiments, computer readable program code is configured such that when executed by a processor, the code causes the data processing system 606 to perform steps related to interference cancellation and/or reporting of certain values, including for instance, quality indicators and reference measurements. In other embodiments, the UE communication device 600 is configured to perform certain steps without the need for code. That is, for example, data processing system1 606 may consist of one or more ASICs. Hence, the features of the present invention described herein may be implemented in hardware and/or software. For example, in particular embodiments, the functional components of the UE communication device 1600 described above may be implemented by data processing system 606 executing computer instructions, by data processing system 606 operating independent of any computer instructions, or by any suitable combination of hardware and/or software.

Figure 7:
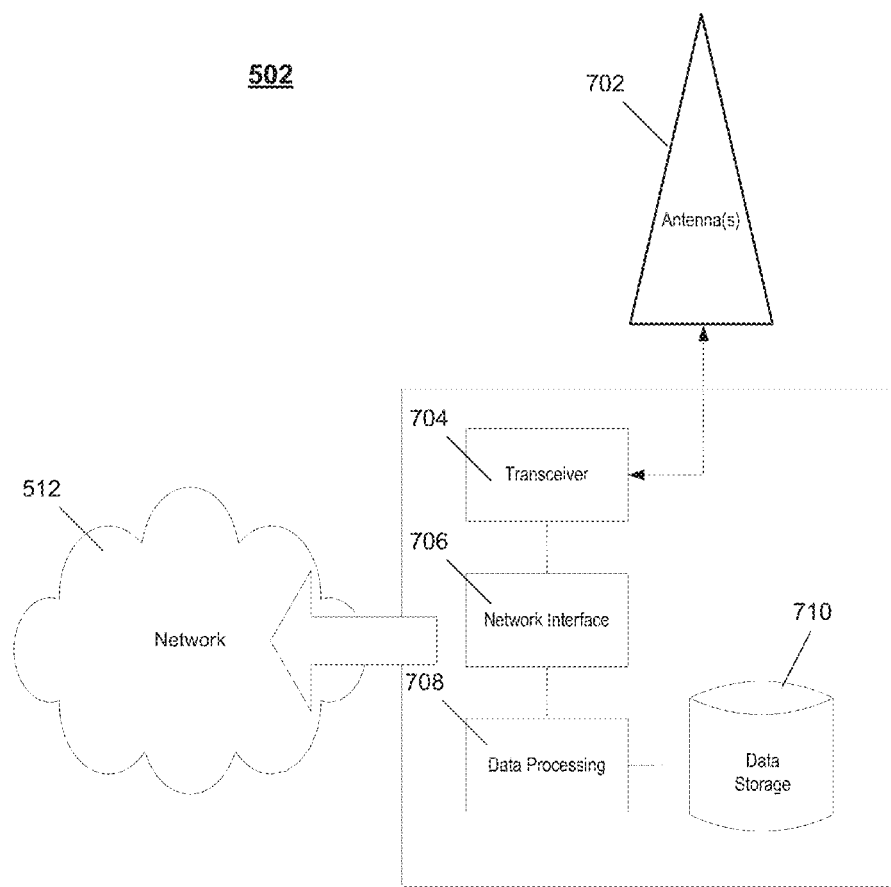
FIG. 7 is a block diagram of a node in accordance with exemplary embodiments of the present invention.

FIG. 7 illustrates a block diagram of an exemplary base station, such as base station 502 shown in FIG. 5. Base stations 504 and 510 may be implemented in a similar manner. As shown in FIG. 7, the base station 502 may include: a data processing system 708, which may include one or more microprocessors and/or one or more circuits, such as an application specific integrated circuit (ASIC), field-programmable gate arrays (FPGAs), and the like; a network interface 706 connected to network 512; and a data storage system 710, which may include one or more non-volatile storage devices and/or one or more volatile storage devices (e.g., random access memory (RAM)). The network interface 706 is connected to transceiver 704, which is configured to transmit and receive signals via one or more antennas 702. According to particular embodiments, the antennas may be configured to include one or more antenna ports. For instance, antenna 702 may include a first antenna port 0, and a second antenna port 1, which correspond to ports 0 and 1 of the LTE specification. In an exemplary embodiment of the disclosed devices and methods, the base station 502 is a Node B or Evolved Node B. According to certain aspects, the disclosed nodes may be macro, micro, pico, and femto nodes operational in a number of cell types and sizes. Cell size and type may include, for instance, very small, small, medium, large, very large, macro, very large macro, micro, pico and femto in accordance with the LTE specification.

In embodiments where data processing system 708 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 708 to perform steps described below (e.g., steps described below with reference to the flow chart shown in FIGS. 9 and 10). In other embodiments, the base station 502 is configured to perform steps described above without the need for code. That is, for example, data processing system 708 may consist merely of one or more ASICs. Hence, the features of the present invention described above may be implemented in hardware and/or software. For example, in particular embodiments, the functional components of the base station described above may be implemented by data processing system 708 executing computer instructions, by data processing system 708 operating independent of any computer instructions, or by any suitable combination of hardware and/or software.

Figure 8:
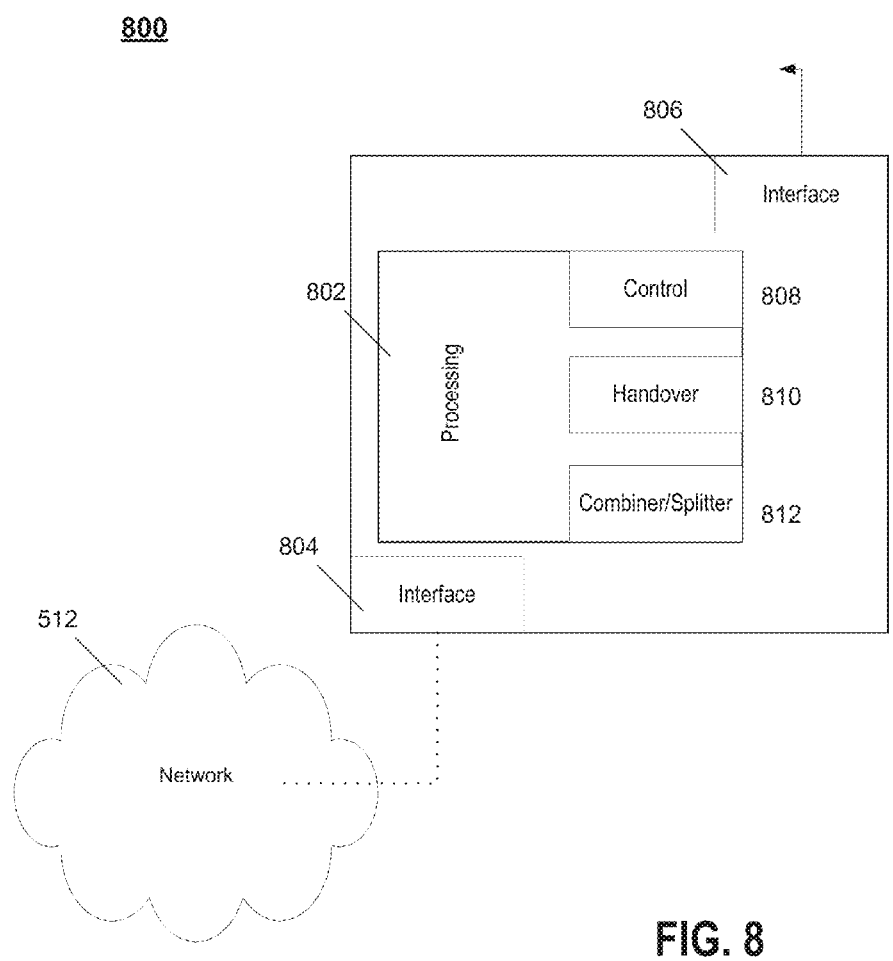
FIG. 8 is a block diagram of a scheduling coordination unit in accordance with exemplary embodiments of the present invention.

FIG. 8 illustrates a block diagram of a particular embodiment of a scheduling coordination unit 800. The scheduling coordination unit 800 may represent, or be a component of, any appropriate radio access network node, such as RNC 514 shown in FIG. 5. As shown in FIG. 8, the scheduling coordination unit 800 may include the following representative elements: a data processing system 802 and one or more interfaces 804 and 806. The interfaces may connect the scheduling coordination unit 800, for instance, to additional radio network controllers, macro base stations such as base station 502, pico base stations such as base station 504, and underlying core networks of the communication infrastructure. These interfaces may enable communication, for instance, via communication network 512. According to certain aspects, the data processing system 802 may include a number of constituent units, such a control section (e.g., controller 808), a handover unit 810, and a combiner and splitter unit 812 in this non-limiting exemplary configuration. Note that in some cases, scheduling coordination functionality may be distributed over multiple different network nodes, so scheduling coordination unit 800 may represent multiple physical components within the relevant network.

In embodiments where data processing system 802 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes the data processing system 802 to perform steps described below (e.g., steps described below with reference to the flow chart shown in FIGS. 9 and 10). In other embodiments, the scheduling coordination unit is configured to perform steps described above without the need for code. That is, for example, data processing system 802 may consist merely of one or more ASICs. Hence, the features of the present invention described above may be implemented in hardware and/or software. For example, in particular embodiments, the functional components of the scheduling coordination unit described above may be implemented by data processing system 802 executing computer instructions, by data processing system 802 operating independent of any computer instructions, or by any suitable combination of hardware and/or software.

Figure 9:
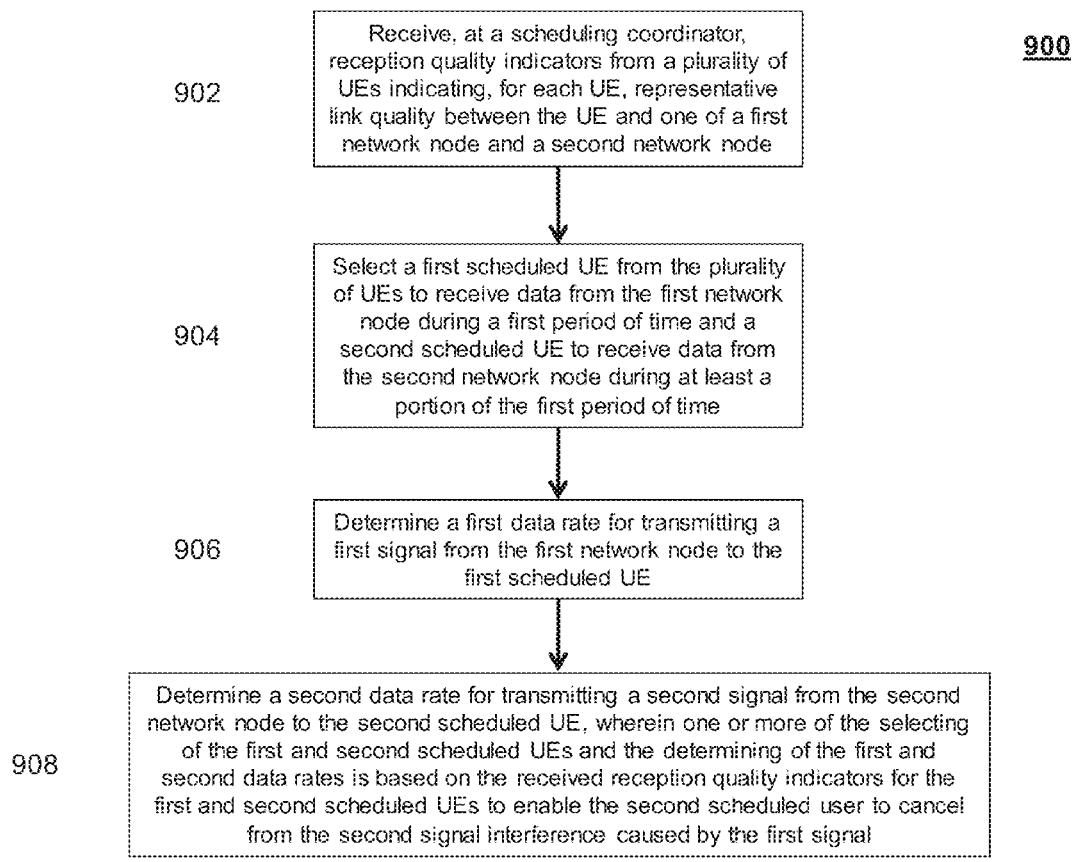
FIG. 9 is a flow chart illustrating a process for cancelling interference in accordance with exemplary embodiments of the present invention

Referring now to FIG. 9, a flow chart 900 illustrating a process for cancelling interference from data transmissions within a communication network is shown. In certain instances, the process 900 may be applied to interference cancellation and scheduling in communication network 500.

In step 902, a scheduling coordinator receives reception quality indicators from a plurality of UEs, such as UE1 and UE2 in the example of FIG. 5. The quality indicators are representative of the link quality between the UEs and first and second network nodes 502, 504. According to certain aspects, the received reception quality indicators may include CQI information.

The CQI report associated with the desired link is provided to the scheduling coordinator. For instance, UE1 reports the quality of its link with base station 504 while UE2 reports the quality of its link with base station 502. Further, the CQI report associated with one or more interference links may also be provided. In certain embodiments, when the CQI of the desired link is measured and reported by a victim terminal, it may be assumed that the CQI associated with the desired link is measured without any benefit of interference cancellation. However, because the victim terminals of the present example are equipped with post-decoding interference cancellation receivers, the terminals may reflect interference mitigation benefits in their CQI reports.

In step 904, the first UE (UE1) is selected and scheduled to receive data from a first network node, such as base station 504 during a first period of time. Similarly, the second UE (UE2) is selected and scheduled to receive data from a second network node, such as base station 502, during at least a portion of the first period of time. As such, the signal intended for UE2 may interfere with the signal intended for UE1 due to the overlap of shared radio resources.

In step 906, a first data rate, to be applied to the first signal transmission from the first base station to the first UE, is determined. In step 908, a second data rate, to be applied to a second signal transmission from the second base station to the second UE, is determined.

The selection of the first and second UEs and/or the determination of the first and second data rates are based on the received reception quality indicator. Specifically, the rates are selected in order to enable the UEs to cancel interference caused by the unintended signal. For instance, in the example of FIG. 5, the data rate for the transmission from base station 502 to UE2 may be reduced to allow UE1 to effectively cancel the interference caused by the transmission. In certain instances, the appropriate selection of UEs may mean that reduction in data rate is not necessary in order to co-schedule the two UEs. However, in further examples, the data rate for transmission to two, or even all, UEs may need to be reduced in order for each UE to effectively cancel the interference of unintended signals. Similarly, a third and/or fourth UE may be selected rather than, or in conjunction with, UEs 1 and 2.

Disclosed methods for the cancellation of interference from data transmissions may further include the step of communicating a transmission data rate adjustment message to the first and/or second network node that includes one or more of reduced modulation order, reduced coding rate, and reduced MIMO rank.

The processes disclosed herein are not limited to the HetNet example of FIG. 5, and as will be discussed further, may be generally applicable to a number of configurations including interference between cells, a HetNet configuration with 3 or more UEs, and same-call multi-user MIMO cases.

Figure 10:
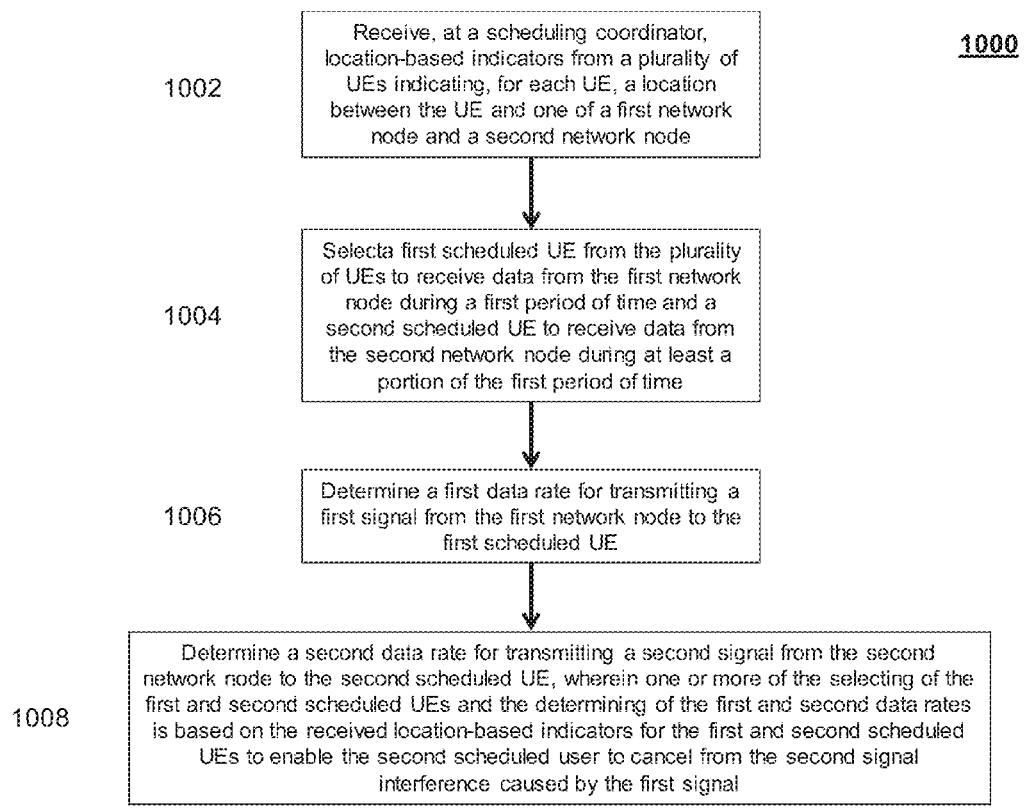
FIG. 10 is a flow chart illustrating a process for cancelling interference in accordance with exemplary embodiments of the present invention

Referring now to FIG. 10, a flow chart 1000 illustrating a process for cancelling interference from data transmissions within a communication network is shown. As with the process 900, the process 1000 may be applied to interference cancellation and scheduling in communication network 500.

In step 1002, a scheduling coordinator receives location-based indicators from a plurality of UEs. These location-based indicators relate to the location of the UE with respect to one of a first and a second network node.

In step 1004, a first scheduled UE is selected from among the plurality of UEs to receive data from the first network node. The first scheduled UE is allocated spectrum resources during a first period of time. A second scheduled UE is also selected from among the plurality of UEs to receive data from the second network node. The second scheduled UE is scheduled during at least a portion of the first period of time.

In step 1006, a first data rate for transmitting a first signal from the first network node to the first scheduled UE is determined. This may be determined, for instance, by the scheduling coordinator.

In step 1008, a second data rate for transmitting a second signal from the second network node to the second scheduled UE is determined. As with step 1006, this determination may be made by the scheduling coordinator.

The selection of the first and second scheduled UEs and/or the determination of the first and second data rates are based on the received location-based indicators for the first and second scheduled UEs. The scheduled UEs and/or data rates are chosen to enable the second scheduled user to cancel from the second signal interference caused by the first signal. For instance, two UEs may be selected such that given their respective locations, the first and second transmission rates do not need to be reduced in order for one or both to effectively cancel unwanted signal interference. However, their relative locations may indicate that one or both transmissions need to be at a rate lower than would typically be selected give their location with respect to the serving nodes.

Figure 11:
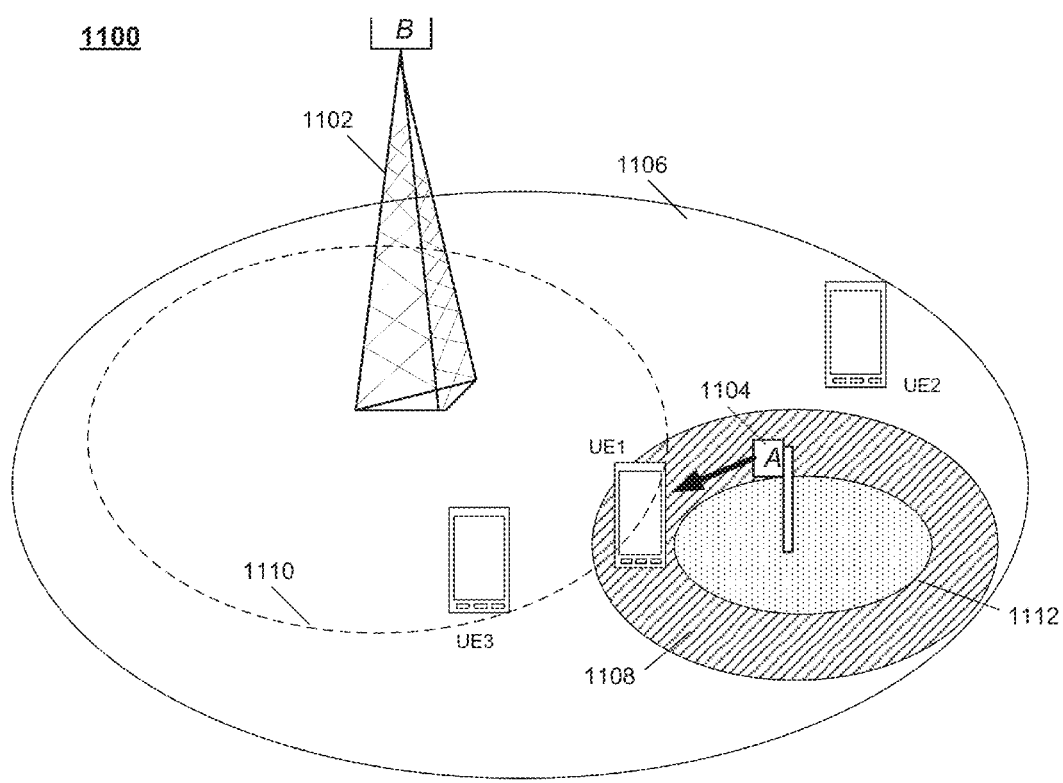
FIG. 11 is an illustration of a communication network in accordance with exemplary embodiments of the present invention.

FIG. 11 illustrates an exemplary configuration for application of the inventive processes in a HetNet scenario. As shown, UE1 is located in the pico range-expansion zone 1108, while both UE 2 and UE 3 are located in the macro coverage area 1106. At its physical location, UE 1 is capable of receiving and decoding transmissions with rates indicated by channel quality measurements $CQI_{P1}$ or $CQI_{M1}$ from either the pico 1104 or macro 1102 node, respectively. Because UE2 is located further from the macro base station, it is only capable of effective reception from the macro cell at a data rate indicated by $CQI_{M2}$, where $CQI_{M2} < CQI_{M1}$. For purposes of this example, it may be assumed that the higher the CQI value, the higher the transmission data rate it corresponds to. With respect to UE3, due to its close proximity to the macro base station, it is capable of effectively reception in the macro cell at a data rate indicated by $CQI_{M3}$, where $CQI_{M3} > CQI_{M1} > CQI_{M2}$.

According to certain aspects of the present invention, a coordinated scheduling decision may be made to schedule UE2 in the macro cell using the transmission data rate corresponding to $CQI_{M2}$, while UE1 is simultaneously served in the pico cell. The interference from the macro base station to UE1, regardless of the power level, can be cancelled by UE1. This is an effective scheduling and rate decision because UE1 has a channel condition that permits it to receive the macro signal at an even higher data rate than $CQI_{M2}$ ($CQI_{M1}$ is greater than $CQI_{M2}$).

In fact, there is an equal-rate contour within the macro cell corresponding to $CQI_{M1}$, which is represented by a dashed circle 1110 in FIG. 11. Since the transmission data rate to macro users outside of such a contour will be equal to or lower than $CQI_{M1}$, scheduling and rate decisions may be location based as opposed to a CQI based, as described in certain embodiments above. According to certain aspects, the macro users outside of this contour can each be co-scheduled with UE1. The interference from UE2 will have limited impact on UE1, since the transmission rate for UE2 is such that the interference from UE2 may be cancelled at UE1.

According to certain aspects, with respect to UEs that reside in the inner pico zone 1112, there should be no restriction on which users in the macro cell are co-scheduled. This is due to the fact that in region 1112, the received power from the pico is higher than from the macro. Thus, macro interference is less of a problem and need not be considered in certain instances.

In situations where there is no macro user with a CQI level equal to or lower than $CQI_{M1}$ (i.e., outside of the $CQI_{M1}$ equal-rate contour 1110), the transmission rate to a co-scheduled macro user, e.g., UE3 in the system of FIG. 11, may be reduced. The rate is lowered to ensure that the pico UE in the range expansion zone 1108, e.g., UE1, can reliably decode the macro signal and thus cancel its interference. This approach is referred to herein as a "reduced-rate resource blocks" or "reduced-rate sub-frames (RRS)" approach.

In this scenario, the transmission data rate to a macro user may be adjusted lower when the same radio resources (resource blocks or sub-frames) are reused by a user in the pico range-expansion zone 1108. This is advantageous in terms of spectral efficiency, particularly when compared to existing blanking (zero-rate) or reduced-power approaches.

Figure 12:
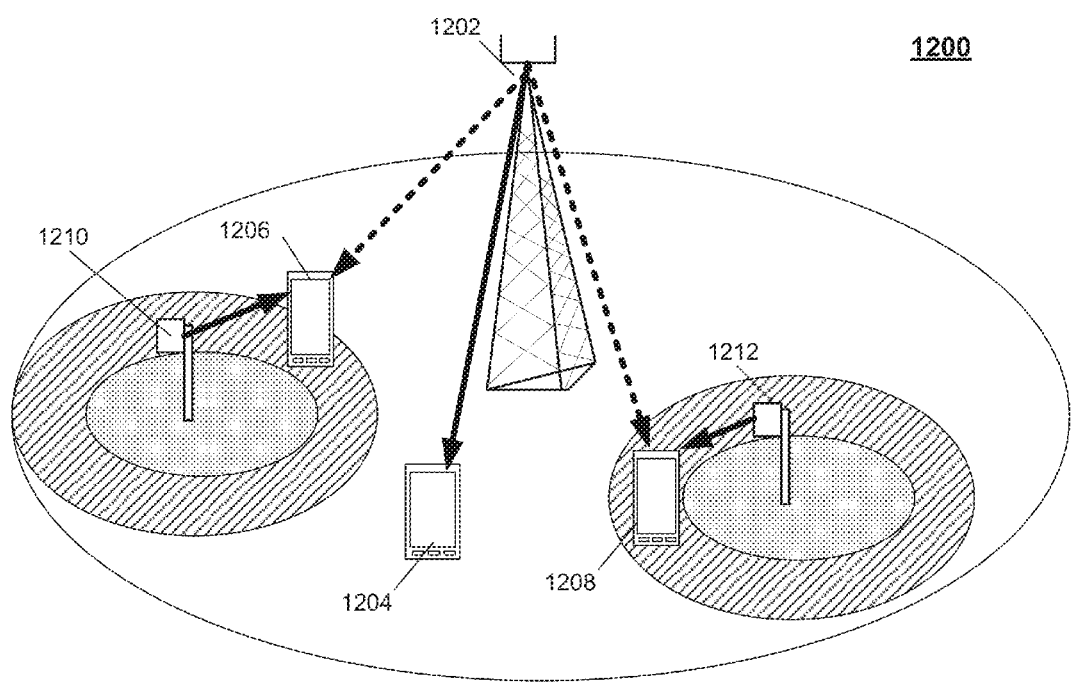
FIG. 12 is an illustration of a communication network in accordance with exemplary embodiments of the present invention.
Figure 13:
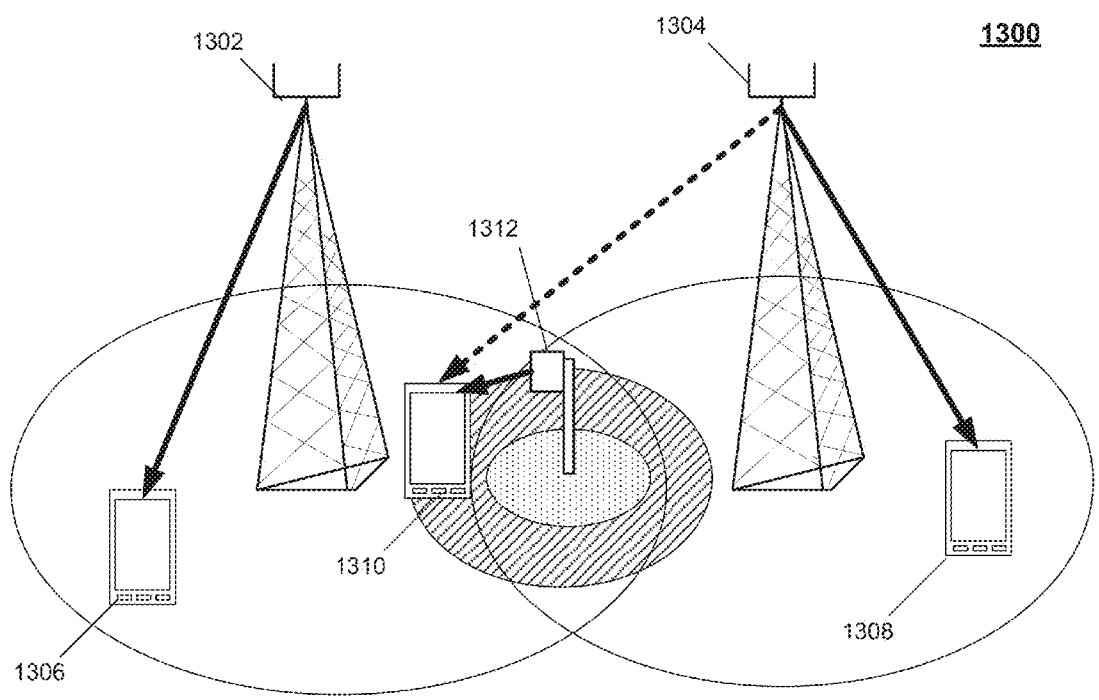
FIG. 13 is an illustration of a communication network in accordance with exemplary embodiments of the present invention.

One of ordinary skill in the art will recognize that the scenario of one macro cell coordinating with one pico cell can be extended to a scenario where one macro cell coordinates with multiple pico cells, as shown in FIG. 12, or a scenario where multiple macro cells coordinate with one pico cell, as shown in FIG. 13.

In FIG. 12, the macro cell may reduce the transmission data rate from base station 1202 to its served terminal 1204. This allows the multiple pico served terminals 1206, 1208 to better decode the macro interference when communicating with pico nodes 1210 and 1212, and consequently provide for an increase in their respective user data rate after interference cancellation.

In FIG. 13, multiple macro cells may reduce the transmission data rates from base stations 1302, 1304 to their respective served terminals 1306, 1308 in order to enable the UE 1310 perform interference cancellation during communications with pico node 1312.

According to certain aspects, transmission-rate reduction may be achieved by using one or more of reduced modulation order, reduced coding rate, and reduced MIMO rank. These rates are reduced in comparison to the recommended values from the intended (desired) terminal's channel quality measurement report.

According to certain aspects, scheduling decisions may be coordinated between macro and pico base stations, and the scheduling coordinator may have access to CQI reports from users in macro and pico cells. In one non-limiting embodiment, the scheduling coordinator may reside in the radio network controller (RNC) of an HSPA system. In a second non-limiting embodiment, coordinating schedulers in the base stations can exchange channel quality information via communication to and from the RNC. In a third non-limiting embodiment, the coordinating schedulers can exchange channel quality information via inter-base-station coordinating protocol(s), such as the X2 protocol specified for LTE.

Figure 14:
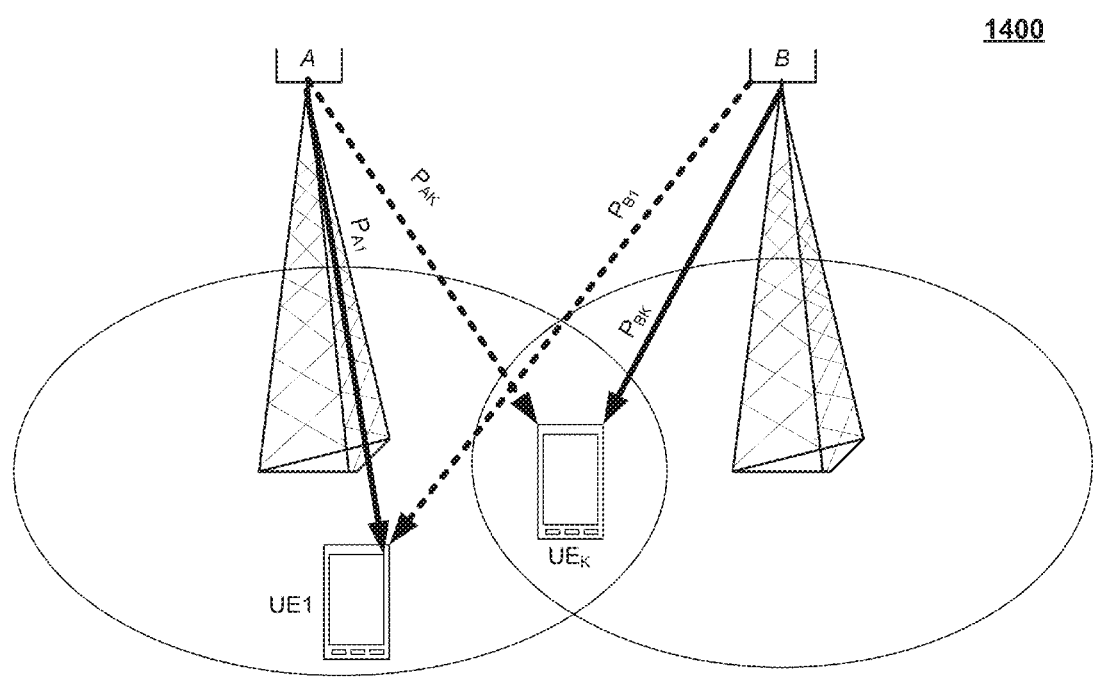
FIG. 14 is an illustration of a communication network in accordance with exemplary embodiments of the present invention.

According to particular embodiments of the present invention, the disclosed processes for mitigation of interference in a HetNet inter-cell interference instance can be generalized to additional network deployments. Here the term "cell" may apply to a coordinated multi-point (CoMP) cell, where antennas at different cell sites work together to serve a user. An example of this configuration is illustrated in FIG. 14. As shown in the example of FIG. 14, UEs 1 and 2 are served by base stations A and B, respectively. The signals from base stations A ($P_{A1}$, $P_{A2}$) and B ($P_{B1}$, $P_{B2}$) cause interference to the unintended co-scheduled UE. In FIG. 14, the desired signals are indicated by solid lines, whereas the unintended interference signals are indicated by dashed lines.

According to certain aspects, UE1 reports to its serving base station (base station A) $CQI_{A1}$ and $CQI_{B1}$, corresponding to the radio links to base stations A and B, respectively. A coordinated scheduling decision may pair UE1 in cell A with a UE, denoted $UE_k$, in cell B which satisfies one of the following conditions:

(i) a $UE_k$ with a receiver not capable of IC reporting $CQI_{Bk}$, while $CQI_{Bk}<=CQI_{B1}$; or (ii) a $UE_k$ with a SIC receiver reporting $CQI_{Bk}$ and $CQI_{Ak}$, while $CQI_{Bk}<=CQI_{B1}$ as well as $CQI_{Ak}>=CQI_{A1}$.

Under the first condition, inter-cell interference can be removed at UE1. The first condition may occur when $UE_k$ and UE1 are approximately the same distance from cell B, but the instantaneous fading condition of the B-k link (i.e. the link between base station B and $UE_k$) is worse than that of the B-1 link (i.e. the link between base station B and UE1). With respect to the second condition, inter-cell interference can be removed at both UE1 and UE2. The second condition may occur when the fading condition for link B-1 is much more favorable than that of link A-1 and also the fading condition of link A-k is much more favorable than that of link B-k.

When neither of the above conditions can be met, the coordinating scheduler can adjust the data rates to the scheduled users in both cells to reap the inter-cell interference cancellation benefit, with the objective of maximizing the sum rate from the co-scheduled users in both cells. For example, the aforementioned reduced-rate approach may be used. One of the coordinating cells reduces the transmission rate to its scheduled user to help a simultaneously scheduled user in a neighboring cell better cancel inter-cell (IC) interference.

Figure 15:
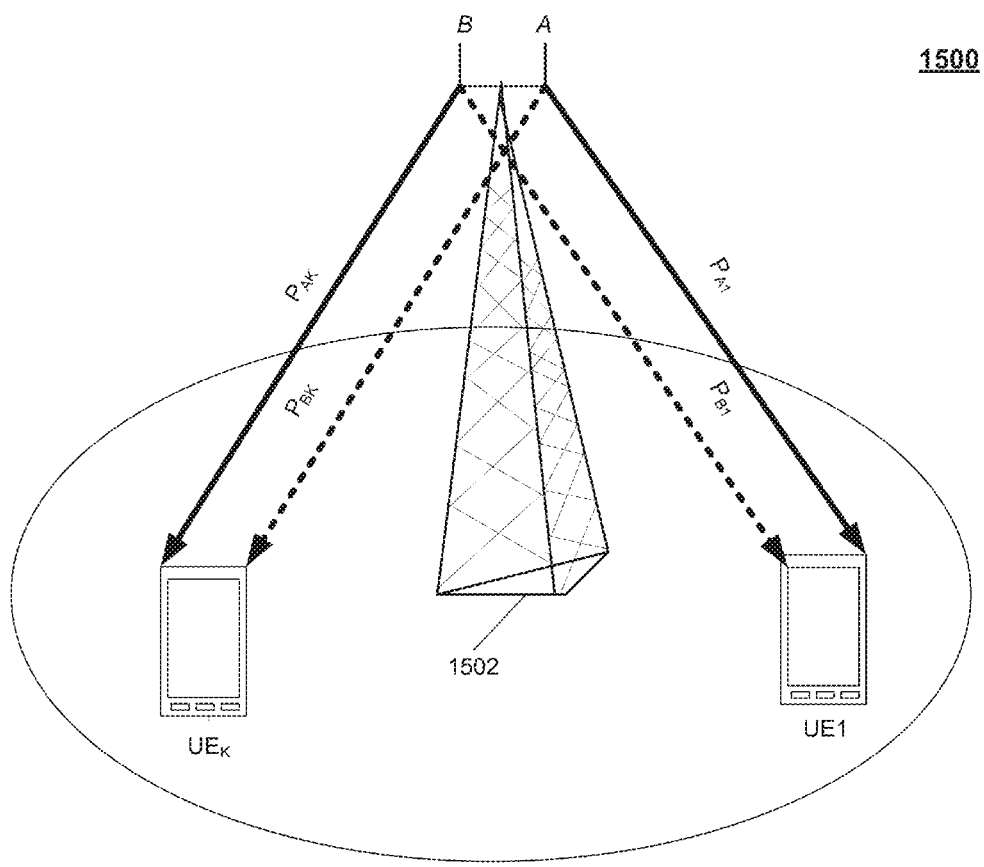
FIG. 15 is an illustration of a communication network in accordance with exemplary embodiments of the present invention.

Similar scheduling considerations as above can be applied to same-cell multi-user MIMO (MU-MIMO) scenarios, such as the system illustrated in FIG. 15. In the implementation of the disclosed scheduling coordination techniques in a same-cell MU-MIMO scenario, for example, there may be no need to exchange CQI information (and/or other measurement reports) between cells. Further, there also may be no need to coordinate scheduling decisions between multiple cells. However, one of ordinary skill will recognize that, if same-cell MU-MIMO interference as well as inter-cell interference are considered jointly, scheduling decisions will have to be coordinated between multiple cells and the CQI information (and/or other measurement reports) need to be exchanged or made available at a coordinating scheduler.

As shown in FIG. 15, a base station 1502 uses antenna A to send one data stream to UE1 and uses antenna B to send another data stream to UE2. In this example, antennas A and B may be physical antennas or virtual antennas (after precoding). For example, in the CoMP case, antennas at different sites may work together through a precoder to form a virtual antenna to serve one or more UEs.

In this example, the signals from antennas A and B cause interference to the other co-scheduled UE. In FIG. 15, the desired signals are indicated by solid lines, whereas the interference signals are indicated by dashed lines.

If UE1 is capable of performing post-decoding interference cancellation, a scheduling strategy may be used that schedules UE2 with a transmission data rate that is achievable at UE1. In this example, a transmission rate that is achievable at a UE means that the UE has a channel condition for receiving signals with such a transmission data rate in an error-free, or near error-free, manner. A UE may be selected which has estimated CQIs that are lower than those of UE1.

For example, in the system of FIG. 15, UE1 has estimated CQIs given by $CQI_{A1}$ and $CQI_{B1}$, which correspond to antennas A and B, respectively. UE1 may, for instance, be instructed by the serving cell to estimate CQI based on the decoding order of antennas B and A, i.e. antenna B signal is detected first and antenna A signal is detected after antenna B signal is cancelled. According to certain aspects, a scheduling pairing scheme is provided that identifies another UE ($UE_k$) to be paired with UE 1 that meets one of the following conditions:

(i) a $UE_k$ with a receiver not capable of IC reporting $CQI_{Bk}$, while $CQI_{Bk}<=CQI_{B1}$;

(ii) a $UE_k$ with a successive interference cancellation (SIC) receiver reporting $CQI_{Bk}$ and $CQI_{Ak}$, assuming the decoding order of antennas B and A, while $CQI_{Bk}<=CQI_{B1}$; or (iii) a $UE_k$ with a SIC receiver reporting $CQI_{Bk}$ and $CQI_{Ak}$, assuming the decoding order of antennas A and B, while $CQI_{Bk}<=CQI_{B1}$ as well as $CQI_{Ak}>=CQI_{A1}$.

These are exemplary ideal pairing conditions because both UE 1 and $UE_k$ can recover their respective desired signals error-free, provided that the CQI estimates are accurate. Also, in all of these instances, the MU-MIMO sum rate is higher those without other-user signal cancellation. The first two conditions are likely to be true when $UE_k$ is much further away from the base station site than UE 1 ($P_{A1}>>P_{Ak}$ and $P_{B1}>>P_{Bk}$). The third condition above is rare and it occurs mainly due to severe disparity between the fading conditions associated with the links corresponding to two transmit antennas.

In some embodiments, a UE may only report the CQI estimate corresponding to the link to the serving base station, e.g., only $CQI_{A1}$ from UE 1 according FIG. 14. Thus, base station B or the network does not know $CQI_{B1}$. Similarly, in this example, $UE_k$ is served by base station B, and thus only $CQI_{Bk}$ is available to base station B and the network. In this case, additional CQI information (e.g., $CQI_{B1}$ and/or $CQI_{Ak}$) needs to be inferred from indirect means.

According to certain aspects, $CQI_{B1}$ may be inferred from UE 1's mobility measurement corresponding to interfering base station B. Similarly, $UE_k$, which is served by base station B may only report $CQI_{Bk}$, and thus $CQI_{Ak}$ may need to be inferred from its mobility measurement corresponding to base station A. The mobility measurement could be based on Common Pilot Channel (CPICH) received power, received signal code power (RSCP), or cell-specific reference signal (C-RS) RSRP.

For example, UE1 may report mobility measurements $M_{A1}$ and $M_{B1}$ regarding base stations A and B, respectively. Thus, for these exemplary mobility measurements, a terminal needs to obtain measurements not only about the serving cell signal strength but also about neighboring cell signal strength. In addition, UE1 reports channel quality indicator $CQI_{A1}$ to its serving base station A. With this information, the network can infer $CQI_{B1}$ as follows:

$$CQI_{B1} \approx CQI_{A1} + M_{B1} - M_{A1},$$

where the values are provided on a decibel scale.

According to another aspect, $CQI_{B1}$ may be inferred from UE1's uplink (UL) signal strength or quality measured at base station B. Similarly, for any $UE_k$ served by base station B, $CQI_{Ak}$ may be inferred from its UL signal strength or quality measured at base station A. Furthermore adjustments to $CQI_{A1}$ and $CQI_{Bk}$ may be made at the UE, serving base station, or scheduler, to account for imperfect inter-cell interference cancellation.

In certain embodiments of the disclosed processes for interference mitigation, the number of interfering base stations could be more than one. Moreover, the scheduler and UE may agree on, implicitly (without using special signaling)

or explicitly (by using special signaling), which base stations are interfering base stations. For example, the interfering base stations may be the ones from which the UE has the highest measured CPICH or C-RS power levels. Moreover, the disclosed examples can be extended to cases where one or more base stations have multiple transmit antennas.

Figure 16:
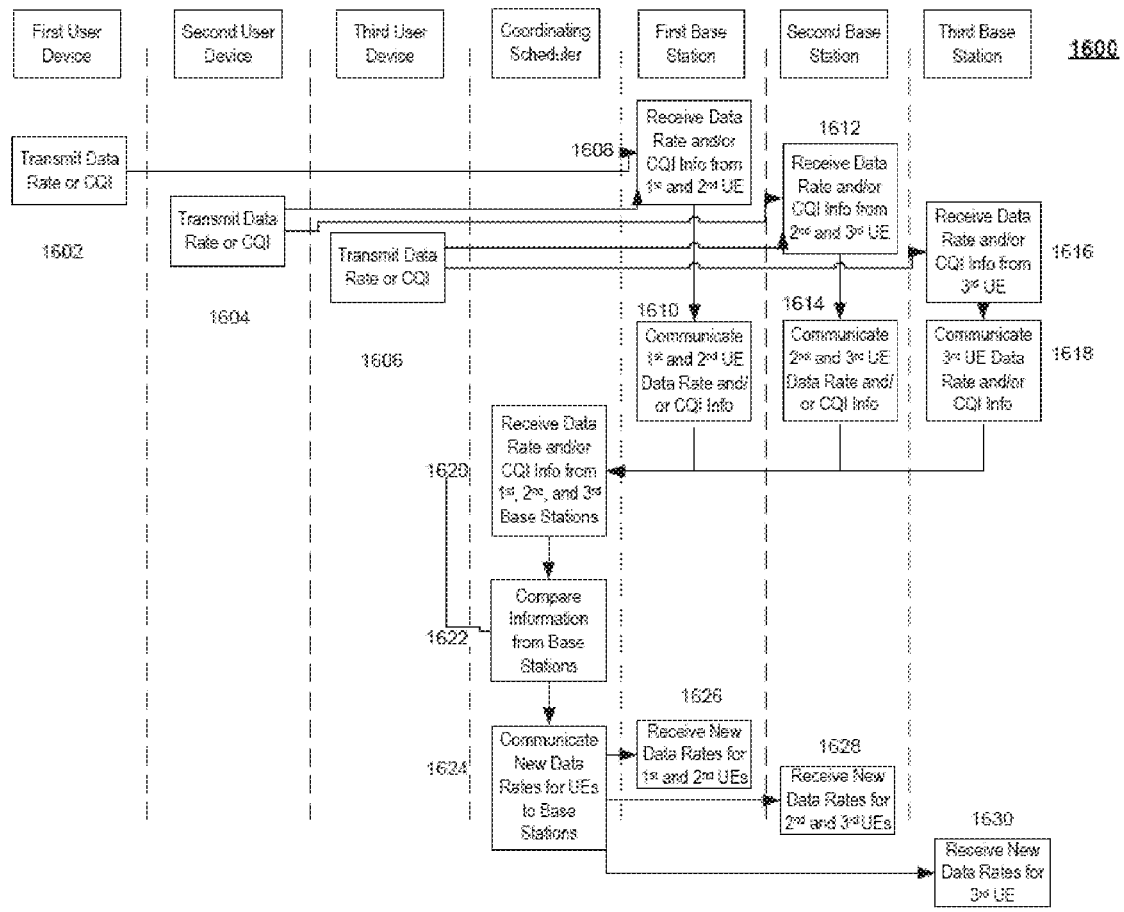
FIG. 16 is an illustration of a transmission sequence in accordance with exemplary embodiments of the present invention.

FIG. 16 provides a transmission sequence 1600 illustrating a number of aspects of particular embodiments of the present invention in a communication network having at least three user devices, three base stations or nodes, and a scheduling coordinator. The scheduling coordinator may be independent or a part of any of the three base stations.

In step 1602, a first user device transmits data rate and/or CQI information. Similarly, in steps 1404 and 1606, second and third user devices also transmit data rate and/or CQI information.

In step 1608, a first base station receives the transmitted information from the first and second user devices. In step 1612, a second base station receives the transmitted information from the second and third user devices. In step 1616, a third base station receives the transmitted information from the third user device.

In steps 1610, 1614, and 1618, the base stations communicate the received data rate and/or CQI information to a coordinating scheduler. According to certain aspects, the coordinating scheduler may be co-located with one of the base stations.

In step 1620, the coordinating scheduler receives the data rate and/or CQI information from the base stations.

In step 1622, the coordinating compares the information from the base stations. This comparison may comprise, for example, performance of the one or more of the aforementioned processes used to mitigate interference. This comparison results in the determination of data rates for the user devices. Depending on the outcome of the comparison, these data rates may be lower than the data rates typically associated with the reported transmission data rates or CQI information.

In step 1624, the new data rates for each of the user devices are communicated to the base stations. In step 1626, the first base station receives new data rates for the first and second user devices. In step 1628, the second base station receives new data rates for the second and third user devices. In step 1630, the third base station receives new data rates for the third user device. These data rates may include, for instance, coding and/or modulation rates.

While various embodiments have been described above, it should be understood that they have been presented by way of example only, and not limitation. Thus, the breadth and scope of the present disclosure should not limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method for cancelling interference from data transmissions within a communication network between user equipment (UE) and network nodes, comprising:
   receiving, at a scheduling coordinator, reception quality indicators from a plurality of UEs indicating, for each UE, representative link quality between each of the UEs and one of a first network node and a second network node;
   selecting a first scheduled UE from the plurality of UEs to receive data from the first network node during a first period of time and a second scheduled UE to receive data from the second network node during at least a portion of the first period of time;
   determining a first data rate for transmitting a first signal from the first network node to the first scheduled UE; and
   determining a second data rate for transmitting a second signal rom the second network node to the second scheduled UE,
   wherein one or more of the selecting of the first and second scheduled UEs and the determining of the first and second data rates is based on the received reception quality indicators for the first and second scheduled UEs to enable the second scheduled UE to cancel from the second signal interference caused by the first signal.

2. The method of claim 1, wherein the received reception quality indicators include channel quality indicator (CQI) information.

3. The method of claim 1, further comprising:
   receiving, at the scheduling coordinator, mobility measurement information from one or both of the first and second scheduled UEs relating to one or more of common pilot channel (CPICH) received power, received signal code power (RSCP) and cell-specific reference signal (C-RS) reference signal received power (RSRP), and
   wherein one or more of the selecting of first and second scheduled UEs and the determining of the first and second data rates is further based on the received mobility measurement information.

4. The method of claim 1, wherein the communication network is a heterogeneous network.

5. The method of claim 4, wherein the first node is a macro base station and the second node is one of a micro, pico and femto base station.

6. The method of claim 1, wherein the received reception quality indicators indicate that the representative link quality between the first scheduled UE and the first network node is lower than the representative link quality between the second scheduled UE and the first network node, and
   wherein the first data rate is determined according to the received reception quality indicators for the first scheduled UE.

7. The method of claim 6, further comprising:
   determining that a third UE from the plurality of UEs should not be scheduled to receive data transmission from the first network node during the first period of time,
   wherein the received reception quality indicators of the third UE indicate that the representative link quality between the third UE and the first network node is higher than the representative link quality between the second UE and the first network node.

8. The method of claim 1, wherein determining the first data rate further comprises:
   determining that the first data rate should be set at a rate that is lower than is indicated by the representative link quality between the first scheduled UE and the first network node.

9. The method of claim 8, wherein the determination of the first data rate includes a reduction in one or more of modulation order, coding rate, and multiple-input-multiple-output (MIMO) rank.

10. The method of claim 1, wherein the scheduling coordinator is implemented in a radio network controller (RNC).

11. The method of claim 1, further comprising transmitting a transmission data rate adjustment message to the first network node including one or more of reduced modulation order, reduced coding rate and reduced multiple-input-multiple-output (MIMO) rank.

12. The method of claim 1, wherein the scheduling coordinator is implemented in one or more of the first network node and the second network node.

13. The method of claim 1, wherein the second reception quality indicator is inferred using one or more of an uplink signal strength and an uplink signal quality measured at the second node.

14. A base station device operable in a communication network including a plurality of user equipment (UEs) and a plurality of network nodes, comprising:
   one or more antennas;
   a network interface; and
   a processor configured to:
      receive reception quality indicators for each of the plurality of UEs indicating representative link quality between the UEs and one of the base station and a network node of said plurality of network nodes;
      select a first scheduled UE from the plurality of UEs to receive data from the from base station during a first period of time and a second scheduled UE to receive data from the network node during at least a portion of the first period of time;
      determine a first data rate for transmitting a signal from the base station to the first scheduled UE; and
      determine a second data rate for transmitting a signal from the network node to the second scheduled UE,
      wherein one or more of selecting the first and second UEs and the determining of the first and second data rates is based on the received reception quality indicators for the first and second UEs to enable the second scheduled UE to cancel from the second signal interference caused by the first signal.

15. The device of claim 14, wherein the received reception quality indicators include channel quality indicator (CQI) information.

16. The device of claim 15, wherein the processor is further configured to:
   receive mobility measurement information from one or both of the first and second scheduled UEs relating to one or more of common pilot channel (CPICH) received power, received signal code power (RSCP) and cell-specific reference signal (C-RS) reference signal received power (RSRP), and
   wherein one or more of the selecting of first and second scheduled UEs and the determining of the first and second data rates is further based on the received mobility measurement information.

17. The device of claim 14, wherein the communication network is a heterogeneous network.

18. The device of claim 17, wherein the base station is a macro base station and the network node is one of a micro, pico and femto base station.

19. The device of claim 14, wherein the received reception quality indicators indicate that the representative link quality between the first scheduled UE and the base station is lower than the representative link quality between the second scheduled UE and the base station, and
   wherein the first data rate is determined according to the received reception quality indicators for the first scheduled UE.

20. The device of claim 19, wherein the processor is further configured to:
   determine that a third UE from the plurality of UEs should not be scheduled to receive data transmission from the base station during the first period of time,
   wherein the received reception quality indicators of the third UE indicate that the representative link quality between the third UE and the base station is higher than the representative link quality between the second UE and the base station.

21. The device of claim 14, wherein the processor is further configured to:
   determine that the first data rate should be set at a rate that is lower than is indicated by the representative link quality between the first scheduled UE and the base station.

22. The device of claim 21, wherein the determination of the first data rate includes a reduction in one or more of modulation order, coding rate, and multiple-input-multiple-output (MIMO) rank.

23. The device of claim 14, wherein the second reception quality indicator is inferred using one or more of an uplink signal strength and an uplink signal quality measured at the network node.

24. A scheduling coordination unit in a communication network including a plurality of user equipment (UEs) and a plurality of network nodes, comprising:
   one or more interfaces; and
   a processor configured to:
      receive reception quality indicators for each of the plurality of UEs indicating representative link quality between the UEs and one of a first network node and a second network node;
      selecting a first scheduled UE from the plurality of UEs to receive data from the first network node during a first period of time and a second scheduled UE to receive data from the second network node during at least a portion of the first period of time;
      determining a first data rate for transmitting a first signal from the first network node to the first scheduled UE;
      determining a second data rate for transmitting a second signal from the second network node to the second scheduled UE,
      wherein one or more of the selecting of the first and second scheduled UEs and the determining of the first and second data rates is based on the received reception quality indicators for the first and second scheduled UEs to enable the second scheduled UE to cancel from the second signal interference caused by the first signal; and
      communicate the first and second data rates to the first and second network nodes via the one or more interfaces.

25. The scheduling coordination unit of claim 24, wherein the processor is further configured to:
   determine that the first data rate should be set at a rate that is lower than is indicated by the representative link quality between the first scheduled UE and the first network node.

26. The scheduling coordination unit of claim 24, wherein the determination of the first data rate includes a reduction in one or more of modulation order, coding rate, and multiple-input-multiple-output (MIMO) rank.

27. A method for cancelling interference from data transmissions within a communication network between user equipment (UE) and a plurality of antennas, comprising:
   receiving, at a scheduling coordinator, reception quality indicators from a plurality of UEs indicating, for each UE, representative link quality between each of the UEs and a first of the plurality of antennas and a second of the plurality of antennas;

selecting a first scheduled UE from the plurality of UEs to receive data from the first antenna during a first period of time and a second scheduled UE to receive data from the second antenna during at least a portion of the first period of time;

determining a first data rate for transmitting a first signal from the first antenna to the first scheduled UE; and determining a second data rate for transmitting a second signal from the second antenna to the second scheduled UE, wherein one or more of the selecting of the first and second scheduled UEs and the determining of the first and second data rates is based on the received reception quality indicators for the first and second scheduled UEs to enable the second scheduled UE to cancel from the second signal interference caused by the first signal.

28. The method of claim 27, wherein the received reception quality indicators include channel quality indicator (CQI) information.

29. The method of claim 27, further comprising:

determining that the first data rate should be set at a rate that is lower than is indicated by the representative link quality between the first scheduled UE and the first antenna, wherein the determination of the first data rate includes a reduction in one or more of modulation order, coding rate, and multiple-input-multiple-output (MIMO) rank.

30. The method of claim 27, wherein the first and second antennas are co-located on a base station.

* * * * *

UNITED STATES PATENT AND TRADEMARK OFFICE
CERTIFICATE OF CORRECTION

PATENT NO. : 9,078,276 B2
APPLICATION NO. : 13/675741
DATED : July 7, 2015
INVENTOR(S) : Wang et al.

Page 1 of 2

It is certified that error appears in the above-identified patent and that said Letters Patent is hereby corrected as shown below:

In the Drawings

In Fig. 6, Sheet 6 of 16, delete "  " and insert -- -- , therefor.

In Fig. 7, Sheet 7 of 16, delete " 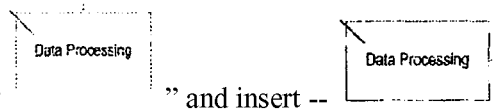 " and insert -- -- , therefor.

In Fig. 8, Sheet 8 of 16, delete " 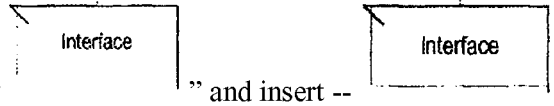 " and insert -- -- , therefor.

In Fig. 10, Sheet 10 of 16, for Step "1004", in Line 1, delete "Selecta" and insert -- Select a --, therefor.

In the Specification

In Column 2, Line 43, delete "system 300" and insert -- network 300 --, therefor.

In Column 6, Line 55, delete "invention" and insert -- invention. --, therefor.

In Column 6, Line 58, delete "invention" and insert -- invention. --, therefor.

In Column 7, Line 57, delete "station" and insert -- stations --, therefor.

In Column 8, Line 21, delete "system1" and insert -- system --, therefor.

Signed and Sealed this
Twenty-third Day of February, 2016

Michelle K. Lee
*Director of the United States Patent and Trademark Office*

CERTIFICATE OF CORRECTION (continued)
U.S. Pat. No. 9,078,276 B2

In Column 8, Line 25, delete "device 1600" and insert -- device 600 --, therefor.

In the Claims

In Column 16, Line 13, in Claim 1, delete "rom" and insert -- from --, therefor.

In Column 17, Line 26, in Claim 14, delete "from base" and insert -- base --, therefor.